United States Patent [19]

Jäger

[11] Patent Number: 4,842,833

[45] Date of Patent: Jun. 27, 1989

[54] METHOD FOR SEPARATING BARIUM FROM WATER-SOLUBLE STRONTIUM COMPOUNDS

[75] Inventor: Paul Jäger, Bad Hönningen, Fed. Rep. of Germany

[73] Assignee: Kali-Chemie Aktiengesellschaft, Fed. Rep. of Germany

[21] Appl. No.: 214,382

[22] Filed: Jul. 1, 1988

[30] Foreign Application Priority Data

Jul. 15, 1987 [DE] Fed. Rep. of Germany ....... 3723320

[51] Int. Cl.$^4$ .............................................. C01F 11/46
[52] U.S. Cl. .................................... 423/160; 423/166
[58] Field of Search ............................... 423/160, 166

[56] References Cited

U.S. PATENT DOCUMENTS

| | | |
|---|---|---|
| 2,035,366 | 3/1936 | Elledge et al. ...................... 423/166 |
| 2,161,650 | 6/1939 | Work et al. ......................... 423/166 |
| 3,574,540 | 4/1971 | Franz et al. ........................ 423/166 |
| 3,655,337 | 4/1972 | Polinsky et al. .................... 423/166 |
| 3,914,163 | 10/1975 | Drinkard et al. .................... 423/144 |
| 4,110,402 | 8/1978 | Bauman et al. ..................... 423/166 |
| 4,282,192 | 8/1981 | Larson ............................... 423/166 |
| 4,495,160 | 1/1985 | Moote et al. ....................... 423/166 |

FOREIGN PATENT DOCUMENTS

| | | | |
|---|---|---|---|
| 613840 | 1/1961 | Canada ................................ 423/166 |
| 56188 | 5/1978 | Japan ................................... 423/166 |
| 787370 | 12/1980 | U.S.S.R. .............................. 423/166 |
| 1117284 | 10/1984 | U.S.S.R. .............................. 423/166 |

OTHER PUBLICATIONS

Caron et al., *Bull. Soc. chim.*, (4), 3, pp. 493–495 (1908).
Barthe et al., *Bull. Soc. chim.*, (3), 7 pp. 104–108 (1892).

*Primary Examiner*—John Doll
*Assistant Examiner*—Wayne A. Lange
*Attorney, Agent, or Firm*—Foley & Lardner, Schwartz, Jeffery, Schwaab, Mack, Blumenthal & Evans

[57] ABSTRACT

A method for separating barium contaminants from soluble strontium compounds comprising adding sulfuric acid and a basic strontium compound in solid, suspended or dissolved form to an aqueous solution of a barium-contaminated soluble strontium compound in controlled amounts with thorough stirring to maintain the pH of the solution between about 3 and about 10; removing solids which precipitate from the solution; and thereafter recovering a strontium compound having a decreased barium content from the solution. The method may be carried out continuously or batch-wise, and the sulfuric acid and basic strontium compound can be added in repeated alternating portions or continuously.

10 Claims, No Drawings

METHOD FOR SEPARATING BARIUM FROM WATER-SOLUBLE STRONTIUM COMPOUNDS

BACKGROUND OF THE INVENTION

The present invention relates to a method for separating barium from water-soluble strontium compounds.

The most important mineral used as a raw material for the production of strontium compounds is celestine. It consists predominantly of $SrSO_4$ and is usually contaminated with barium compounds. In order to use strontium compounds in certain sectors of industry, e.g., in coating television picture tubes and also in medicine, substantially barium-free strontium salts are often required. It is therefore necessary to separate or remove the naturally occurring barium content from strontium salts.

Methods for reducing the barium content in strontium compounds are already known. According to H. Caron and D. Raquet, *Bull. Soc. chim.* (4), 3, pages 493 to 495 (1908), the barium content of an $SrCl_2$ solution contaminated with 25% $BaCl_2$ can be reduced to 1% by adding $SrSO_4$, allowing the solution to stand for 48 hours and subsequently filtering. Further removal is effected by precipitation with $K_2CrO_4/K_2Cr_2O_7$. With this method, contamination of the low-barium product with the toxic chromate may occur.

L. Barthe and E. Falieres, *Bull. Soc. chim,* (3), 7, pages 104 to 108 (1892) report on several compounds, which have lead to unsatisfactory results. These include reaction with hexafluorosilicic acid, carbonates, sulfates (inter alia, $SrSO_4$) and with sulfuric acid of varying concentration. These authors recommend a method of separating barium by adding $SrSO_4$ to a strongly hydrochloric acid solution of $SrCl_2$ containing $BaCl_2$. This method, however, requires a subsequent reaction phase of several days.

SUMMARY OF THE INVENTION

It is the object of the present invention to provide an improved method of effectively separating barium from strontium compounds.

Another object of the invention is to provide a method of separating barium from strontium compounds which avoids introduction of toxic materials into the low-barium product.

It is also an object of the invention to provide a method of separating barium from strontium compounds which does not require excessively long reaction times.

These and other objects of the invention are achieved by providing a method of separating barium contaminants from soluble strontium compounds comprising the steps of adding sulfuric acid and a basic strontium compound in controlled amounts to an aqueous solution of a barium-contaminated soluble strontium compound with thorough stirring, said amounts being controlled to maintain the pH of the solution between about 3 and about 10; removing solids which precipitate from the solution; and thereafter recovering a strontium compound having a decreased barium content from the solution.

The soluble strontium compound in the solution is preferably a strontium halide such as strontium chloride, and the added basic strontium compound may be introduced into the solution in solid, suspended or dissolved form. The method may be carried out continuously or batch-wise, and the sulfuric acid and basic strontium compound can be added in repeated alternating portions or continuously.

DETAILED DESCRIPTION OF PREFERRED EMBODIMENTS

The method according to the invention for separating barium from water-soluble strontium compounds is characterized in that (a) aqueous sulfuric acid and a basic strontium compound are added during thorough stirring to an aqueous solution containing a dissolved strontium compound and barium ions, either (I) the sulfuric acid and the basic strontium compound being added one after the other, preferably alternately in portions, the addition of sulfuric acid taking place up to a reduction in the pH value to not below about 3 and the addition of the basic strontium compound taking place up to an increase in the pH value up to at most about 10, or (II) the sulfuric acid and the basic strontium compound being added simultaneously, the pH value in the reaction mixture being kept substantially in the range of about 3 to about 10 by controlling the manner of addition, and (b) subsequently precipitated solid is separated from the solution and a strontium compound which is depleted in barium is obtained from the solution.

The method according to the invention is suitable for the treatment of water-soluble strontium salts, in particular inorganic salts, for instance, strontium halides such as $SrBr_2$, $SrCl_2$, other inorganic water-soluble salts such as $Sr(NO_3)_2$, etc., and is preferred for use in treating $SrCl_2$.

In particular, dilute sulfuric acid with a concentration of up to approximately 2 molar, e.g., from approximately 0.01 to 2 molar, preferably with a concentration of up to 0.5 molar, is used as the aqueous sulfuric acid.

According to the invention, the term "basic strontium compound" is understood to refer to any strontium compound which has a pH value of greater than 7 in aqueous solution. Preferably $SrCO_3$, $SrO$ and/or $Sr(OH)_2.nH_2O$ wherein $n=0-8$, for example $Sr(OH)_2$ or $Sr(OH)_2.8H_2O$, is added. $Sr(OH)_2.8H_2O$ is especially preferred. The basic strontium compound may be introduced into the reactor in the solid, suspended or dissolved state. In the method according to the invention, the addition of a solid, basic strontium compound is preferred.

In introducing controlled amounts of the dilute sulfuric acid and the basic strontium compound into the reactor, thorough mixing of the reactor contents must be ensured. Thorough mixing may be effected, for example, with a mechanical mixer operating at high speed.

In one variant of the method according to the invention, portions of the sulfuric acid and the basic strontium compound may be added successively, i.e., one after the other. Preferably the sulfuric acid and basic strontium compound are repeatedly added in alternating portions.

The pH value of the reaction mixture should not fall below about 3 when the sulfuric acid is added and should not rise to more than about 10 when the basic strontium compound is added. That is to say, during the addition of sulfuric acid, the reaction mixture should not become more acid than corresponding to a pH value of about 3 and during the addition of the basic strontium compound, the reaction mixture should not become more basic than corresponding to a pH value of about 10. Control of the pH may be effected, for exampe, using commercially available single-rod pH electrodes.

In a variant of the method according to the invention, the sulfuric acid and the basic strontium compound are added simultaneously, i.e., sulfuric acid and the basic strontium compound are introduced simultaneously in controlled amounts into the reactor while stirring thoroughly. When the reactor is appropriately constructed to permit such introduction procedures, the introduction may be effected by means of nozzles, vibratory feeders or other devices for introducing the constituents. The reactants may be introduced in controlled amounts into the reactor directly adjacent to each other, but preferably they are introduced at a greater distance from each other. The manner and rate of introduction of the acid and basic strontium compound are controlled to keep the pH value in the receptacle substantially in the range from about 3 to about 10.

Following the addition of ulfuric acid and basic strontium compound in stage (a), regardless of whether they are delivered successively according to variant (I) or simultaneously according to variant (II), in stage (b) precipitated solid is separated from the solution. Preferably the separation of precipitated solid from the solution in stage (b) takes place immediately following stage (a). This separation may be carried out in a known manner, e.g., by filtration or centrifugation. A strontium compound which is depleted in barium may thereafter be obtained from the resulting solid-free solution, either by physical methods, e.g., by crystallization through evaporation, or by chemical reactions known to persons skilled in the art which form strontium salts of low solubility.

Before separating the solid in stage (b), if desired, a subsequent reaction phase of a few hours, for instance up to 3 hours, may be provided optionally with further stirring of the reaction mixture.

The concentration in which the water-soluble strontium compounds in the method according to the invention may be present is dependent on the type of salt used. The upper limit is determined by the saturation concentration; the lower limit is about 1/50 of the saturation concentration. Good results have been obtained starting from aqueous strontium salt solutions with a concentration in the range from about 1/10 to about 4/5 of the saturation concentration.

According to the invention, the method of separating barium may be carried out not only batchwise, but—with the same limiting conditions as regards pH value of the reaction mixture, type and concentration of the starting compounds, etc.,—also continuously. This variant is characterized in that in a continuous method (a) the solution containing the dissolved strontium compound and barium ions, the aqueous sulfuric acid and a basic strontium compound are continuously added alternately in portions, or continuously or in batches simultaneously into a reactor with thorough stirring, and a quantity of the reaction mixture, corresponding to the amount of the starting materials which is introduced, is removed from the reactor continuously or in batches, and (b) precipitated solid from the removed reaction mixture is separated, and a strontium compound which is depleted in barium is obtained from the remaining solution.

Both when the method according to the invention is carried out batch-wise and also continuously, the reaction is preferably carried out at room temperature or at somewhat lower temperatures ranging down to about 10° C.

A surprising result in carrying out the separation of barium from water-soluble strontium salts according to the invention is the short amount of time required to obtain filterable or centrifugable solids enriched in barium. Preferably, a subsequent reaction phase may be omitted.

In view of the aforementioned low effectiveness of the previously known methods for separating barium from dissolved strontium compounds, the high purity of the product of the method according to the invention is also surprising, in which—without the use of the toxic chromate—a decrease in barium content from, for instance, about 0.5 g Ba per 100 g $SrCl_2$ to about 0.001 g Ba per 100 g $SrCl_2$, is achieved. Besides avoiding use of toxic additives, a further advantage of the method according to the invention is that the method is preferably carried out at room temperature, so that no energy is required for heating.

The strontium compounds obtained from the method according to the invention can be used, inter alia, for producing pharmaceutical preparations, in fireworks and in the manufacture of glass.

The following illustrative examples will serve to further explain the method according to the invention without restricting the scope of the invention.

EXAMPLE 1 comparison example 500 g of a strontium chloride solution containing 21.9% weight $SrCl_2$ were shaken with 460 g of freshly precipitated $SrSO_4$ for 4 hours at room temperature. After filtering, analysis showed that the barium content of the strontium chloride solution had fallen from 2 g Ba per 100 g of $SrCl_2$ to 0.85 g Ba per 100 g of $SrCl_2$.

EXAMPLE 2 alternating introduction of reactant portions.

A 0.5 molar sulfuric acid solution was added dropwise to 1435 g of a strontium chloride solution containing 35.5% weight $SrCl_2$ and having a pH value of 6.4 at room temperature with intensive stirring until the pH value was 6.0. Then solid $Sr(OH)_2.8H_2O$ was added up to a pH value of 9. Then 0.5 molar sulfuric acid was again introduced until the pH value reached 6. Thereafter, $Sr(OH)_2.8 H_2O$ was again added up to pH value 9. The sequence of alternating additions of sulfuric acid and basic strontium compound was continued until after 25 such cycles, a total 140 ml of the sulfuric acid and 9.6 g of the Sr salt had been fed to the reaction solution. After one hour of subsequent stirring, the solution was filtered. Analysis showed that the barium content, which at first was 0.257 g Ba per 100 g of $SrCl_2$, had fallen to 0.032 g Ba per 100 g of $SrCl_2$ in the filtrate of the reaction mixture.

EXAMPLE 3 simultaneous introduction of reactants 0.5 molar sulfuric acid and solid $Sr(OH)_2.8 H_2O$ were continuously introduced in controlled amounts into a strontium chloride solution containing 232 g $SrCl_2$/liter with thorough stirring at room temperature over the course of 2 hours. The pH value of the reaction mixture was kept at between 3 and 4. Thereafter, the reaction mixture was immediately centrifuged. The barium content, which at first was 0.5 g Ba per 100 g of $SrCl_2$, was decreased to 0.001 g Ba per 100 g $SrCl_2$ in the remaining solution after centrifugation.

The foregoing description and examples have been set forth merely to illustrate the invention and are not intended to be limiting. Since modifications of the illustrative embodiments incorporating the spirit and substance of the invention may occur to persons skilled in the art, the scope of the invention should be limited solely with respect to the appended claims and equivalents.

What is claimed is:

1. A method for separating barium from watersoluble strontium compounds wherein
   (a) aqueous sulfuric acid and a basic strontium compound are added with thorough stirring to an aqueous solution containing a dissolved strontium compound and barium ions, either
      (I) the sulfuric acid and the basic strontium compound being added successively, the addition of sulfuric acid taking place up to a reduction in the pH value to not below about 3, and the addition of the basic strontium compound taking place up to an increase in the pH value to at most about 10, or
      (II) the sulfuric acid and the basic strontium compound being added simultaneously, the pH value in the reaction mixture being kept in the range of about 3 to about 10 by controlling the amounts of material added, and
   (b) subsequently precipitated solid is separated from the solution, and a strontium compound which is depleted in barium is obtained from the solution.

2. A method according to claim 1, wherein said dissolved strontium compound is an inorganic strontium salt.

3. A method according to claim 2, wherein said inorganic strontium salt is a strontium halide.

4. A method according to claim 3, wherein said strontium halide is strontium chloride.

5. A method according to claim wherein sulfuric acid with a concentration of up to about 2 molar is used.

6. A method according to claim 5, wherein sulfuric acid with a concentration of up to about 0.5 molar is used.

7. A method according to claim 1, wherein the basic strontium compound is selected fom the group consisting of $SrCO_3$, $SrO$, $Sr(OH)_2.nH_2O$ wherein n=0–8, and mixtures of at least two of the foregoing.

8. A method according to claim 7, wherein said basic strontium compound is $Sr(OH)_2.8H_2O$.

9. A method according to claim 1, wherein said sulfuric acid and said basic strontium compound are repeatedly added in alternating portions.

10. A method according to claim 1, wherein in a continuous method
   (a) the solution containing the dissolved strontium compound and barium ions, the aqueous sulfuric acid and a basic strontium compound are continuously added alternately in portions or simultaneously into a reactor with thorough stirring, and a quantity of the reaction mixture corresponding to the amount of added materials is removed from the reactor continuously or in batches, and
   (b) precipitated solid from the removed reaction mixture is separated and a strontium compound which is depleted in barium is obtained from the remaining solution.

* * * * *